United States Patent [19]

Freudenberg et al.

[11] Patent Number: 5,134,100
[45] Date of Patent: Jul. 28, 1992

[54] MIXTURE OF RAW MATERIALS WITH IMPROVED PROCESSING PROPERTIES, A PROCESS FOR THEIR PREPARATION AND THEIR USE

[75] Inventors: Bernhard Freudenberg, Coburg, Fed. Rep. of Germany; Peter Thometzek, Spezzano di Fiorano, Italy

[73] Assignee: Bayer Aktiengesellschaft, Leverkusen, Fed. Rep. of Germany

[21] Appl. No.: 516,016

[22] Filed: Apr. 26, 1990

[30] Foreign Application Priority Data

May 12, 1989 [DE] Fed. Rep. of Germany ....... 3915496

[51] Int. Cl.$^5$ ............................................. C04B 35/10
[52] U.S. Cl. .................................. 501/127; 501/134; 427/215; 428/403
[58] Field of Search ................ 501/134, 127; 427/215, 427/218; 428/361, 375, 378, 384, 386, 387, 389, 403

[56] References Cited

U.S. PATENT DOCUMENTS

| | | | |
|---|---|---|---|
| 3,522,079 | 7/1970 | Wiseman | 427/215 |
| 3,552,995 | 1/1971 | Powell | 427/215 |
| 3,607,343 | 9/1971 | Longo et al. | 501/134 |
| 4,050,951 | 9/1977 | Piccolo et al. | 427/215 |
| 4,593,007 | 6/1986 | Novinski | 501/134 |
| 4,675,251 | 6/1987 | Matijevic et al. | 427/215 |
| 4,851,293 | 7/1989 | Egerton et al. | 427/215 |

FOREIGN PATENT DOCUMENTS

WOA8800577 1/1988 PCT Int'l Appl. .

OTHER PUBLICATIONS

A. S. Rao, "Effect of pH on the Suspension Stability of Alumina, Titania and Their Mixtures", Ceramics International, 13, (1987), pp. 233-241.
A. S. Rao, "Effect of Surface Active Agents on the Electrokinetic and Rheological Behaviour of Alumina and Titania Slips", Ceramics International, 14, (1988), pp. 141-146.
N. M. Filatova et al., "Rheological and Technicological Properties of Aqueous Slips Based on Magnesium Aluminate and Aluminum Titanate", Celloid. J. USSR (English Translation), 46, 1984, pp. 729-732.
I. A. Aksay et al., "Uniformity of $Al_2O_3$-$Zro_2$ Composites by Colloidal Filtration", J. Amer. Ceram. Soc., 66, (1983), pp. C190-C192.
E. M. deLiso et al., "Application of Electrokinetic Properties to the Fabrication of an Alumina-Zirconia Composite", Advanced Ceram. Mater., 3, (1988), pp. 407-410.
Y. E. Pivinskii et al., "Obtaining Corundum-Zirconium Suspensions, Their Rheological and Bonding Properties", Ogneupory (English Translation), 6, (1984), pp. 347-351.
P. E. Debeley et al., "Preparation and Sintering Behaviour of Fine-Grained $Al_2O_3$-$SiO_2$ Composite", J. Amer. Ceram. Soc., 68, (1985), pp. C76-C78.
E. M. Rabinovich et al., "Slip Casting of Silicon Nitride for Pressureless Sintering", J. Mater. Sci., 17, (1982), pp. 323-328.
K. Kishi et al., "Interaction of Aluminum/Iso-Propoxide Solution and $Si_3N_4$ Powder", J. Ceram. Soc., Jpn. Inter. Ed., 96, (1988), pp. 687-689.
Journal of Materials Science vol. 24 No. 5 Mai 1989, London GB pp. 1867-1889 H. Okamura et al. "Preparation and sintering of narrow-sized A 1203 T102 composite powders" pp. 1867 Zeile 16 PGs. 1869 Zeile 16.
Journal of Materials Science vol. 21, No. 12, 1986 London GB pp. 4431-4435 PA Brugger et al. "Preparation of composite A1203-T102 particles from organometallic precursors and transformations during heating".
Chemical Abstracts vol. 107, No. 16 1987, Columbus Ohio Kim et al.; "Adsorption of alpha-ferric oxide on the surface of mica particles" p. 330.
World Patents Index Latest Derwent Publications Ltd. London GB Accession No. 81-086120 (wk 8106) & JP 55154317 (Ishihara Sangyo Kaisha (Feb. 12, 1980).

Primary Examiner—William R. Dixon, Jr.
Assistant Examiner—Sue Hollenbeck
Attorney, Agent, or Firm—Sprung Horn Kramer & Woods

[57] ABSTRACT

A ceramic raw material mixture with improved processing properties comprising at least two chemically different raw material components, wherein at least two of the raw material components have the same type of cation on the surface thereof, at least one of the raw material components being coated with said type of cation and the coating, calculated as cation oxide, amounting to 0.01 to 6% by weight, based on the coated component, and all the raw material components having a surface with an isoelectric point of $\leq$pH 7.

16 Claims, No Drawings

MIXTURE OF RAW MATERIALS WITH IMPROVED PROCESSING PROPERTIES, A PROCESS FOR THEIR PREPARATION AND THEIR USE

BACKGROUND OF THE INVENTION

1. Field of the Invention

This invention relates to mixtures of raw materials consisting of modified ceramic raw materials with improved processing properties, to a process for their preparation and to their use.

2. Background Information

The dispersion of ceramic raw materials in inorganic or organic media is a conventional intermediate step in ceramic shaping processes such as slip casting, tape casting, injection molding and extrusion and in the spray drying of slips. In all these cases, the processing properties and the quality of the resulting sintered bodies depend partly on the quality of the dispersion. A complete dispersion with long term stability has the effect inter alia of reducing the reject rate, increasing the strength, shortening the firing cycles and reducing the shrinkage in sintering due to the greater green density, i.e., the dimensional stability is improved.

When dispersing mixtures of raw materials consisting of chemically differing components it is particularly difficult to obtain both complete dispersion and at the same time long term suspension stability. Addition of dispersants and adjustment of the pH (in the case of an aqueous dispersion media) are generally employed to deal with the problems of agglomeration, heterocoagulation and demixing of multicomponent suspensions, as documented by the following literature.

In "Effect of pH on the Suspension Stability of Alumina, Titania and their Mixtures", Ceramics International, 13 (1987), pages 233–241, A. S. Rao investigates the stability of aqueous $Al_2O_3+TiO_2$ suspensions by varying the pH over a wide range. The suspension has its greatest stability at pH 2, but cannot be employed at this pH on account of its corrosive action among others on the plaster of Paris molds. Moreover, $Al_2O_3$ partly dissolves at $pH \leq 5$. The use of commercial dispersants based on amines has not provided any improvement compared with dispersant-free variations, as shown by A. S. Rao in "Effect of Surface Active Agents on the Electrokinetic and Rheological Behaviour of Alumina and Titania Slips", Ceramics International, 14 (1988), pages 141–146.

N. M. Filatova et al prepare slips of $MgAl_2O_4+Al_2TiO_5$ in water, as described by them in "Rheological and Technicological Properties of Aqueous Slips Based on Magnesium Aluminate and Aluminium Titanate" in Colloid. J. USSR (English translation) 46 (1984), pages 729–732 seq. They also recommend the acid range of pH 2.5–4 for obtaining a workable slip but the addition of HCl increases corrosion and produces an undesirable increase in the electrolyte concentration in the slip.

I. A. Aksay et al prepare a high strength $Al_2O_3$ ceramic with finely dispersed $ZrO_2$ (30 vol.-%) by way of the aqueous slip as described by them in "Uniformity of $Al_2O_3$-$Zro_2$ Composites by Colloidal Filtration", J. Amer. Ceram. Soc., 66 (1983), pages C190–C192. The optimum stability of the slip is found at pH 2–3.5. The pH changes in the course of storage of the slip.

In "Application of Electrokinetic Properties to the Fabrication of an Alumina-Zirconia Composite", Advanced Ceram. Mater., 3 (1988), pages 407–410, E. M. deLiso et al describe the contradictory requirements of a suspension which is required to ensure both optimum dispersion of $Al_2O_3$ and optimum dispersion of $ZrO_2$. Since the two components cannot both be optimally dispersed in a single step, the authors propose the complicated procedure of converting each of the components separately into slips and then mixing the two suspensions.

In "Obtaining Corundum-Zirconium Suspensions, their Rheological and Bonding Properties", Ogneupory (English translation), 6 (1984), pages 347 et seq, Y. E. Pivinskii et al give a narrow pH range of 2.5–3.5 for preparing a slip of $Al_2O_3+ZrSiO_4$ which reacts on sintering to form mullite and $ZrO_2$.

In "Preparation and Sintering Behaviour of Fine-Grained $Al_2O_3$-$SiO_2$ Composite", J. Amer. Ceram. Soc., 68 (1985), pages C76–C78, P. E. Debely et al make use of the heterocoagulation of $Al_2O_3$ and $SiO_2$. They cover the $Al_2O_3$ particles in the slip which have an average diameter of 0.3 $\mu m$ and are positively charged at pH 3 with negatively charged $SiO_2$ particles measuring 0.02 $\mu m$. This requires slow, controlled introduction of the $Al_2O_3$ suspension into the $SiO_2$ suspension. The excess $SiO_2$ is removed by centrifuging. This method cannot be used for producing powders which are storage stable in the dry state and redispersible.

In "Slip Casting of Silicon Nitride for Pressureless Sintering", J. Mater. Sci., 17, (1982), pages 323–328, E. M. Rabinovich et al compare the preparation of slips of $Si_3N_4+MgAl_2O_4$ by pH adjustment with the preparation of these slips by the addition of commercial dispersants Relatively fluid suspensions are obtained both in the acid and in the alkaline range. Owing to the evolution of gas in the acid range, the authors opt for the alkaline range for slip casting silicon nitride crucibles. The high linear sintering shrinkage of 20–25% is evidence of unsatisfactory dispersion quality.

A fundamentally different method is proposed by M. Persson in WO-A 88/00577, according to which the sintering additive (exclusively Al in all the examples) is precipitated on the dominant powder components ($Si_3N_4$, Si and $ZrO_2$ in the examples). In another example, the surface of the $Si_3N_4$ powder and the Si powder is adjusted by coating with Al to the isolectric points of the $Al_2O_3$ powder (2%) and $Y_2O_3$ powder (6%) present at the same time. Coating of the powders comprises several steps (Example 1): The powder is stirred into a solution. of aluminium isopropoxide/hexane and then dispersed in a mill. The suspension is concentrated by evaporation at 120° C. for at least 30 minutes. According to Claim 1, calcination is necessary. The dried cake must not be milled (page 5, line 27). The ceramic slip may only be stirred for further processing (page 5, line 27). This step of the process, however, is not sufficient to destroy the dry agglomerates which have been cemented together by the aluminium oxide/hydroxide precipitation. The drying of the bodies without formation of cracks described in the above reference says nothing about the quality of the redispersed, coated raw materials.

The possibility of using cations other than those of aluminium is discussed, in particular silicon cations. The examples of practical embodiment, however, are limited to aluminium isopropoxide. No further details are given concerning the advantages or disadvantages of the various cation compounds. No coating variations in multicomponent systems are disclosed.

SUMMARY OF THE INVENTION

It is an object of the present invention to prepare a mixture of raw materials which does not have the disadvantages described above.

A raw material mixture free from the above-described disadvantages has now surprisingly been found, consisting of modified raw materials. The invention relates to a ceramic raw material mixture consisting of at least two chemically different raw material components having improved processing properties, characterised in that at least two raw material components have the same type of cation on the surface and at least one of these raw material components is coated with this type of cation, the coating amounting to 0.01 to 6% by weight, calculated as cation oxide and based on the coated powder component, and all raw material components have a surface with an isoelectric point of $\leq pH\ 7$.

DETAILED DESCRIPTION OF THE INVENTION

From 0.01 to 6% by weight of coating cation compound, calculated as cation oxide and based on the coated powder component, is generally sufficient for improving the processing properties.

The coating preferably amounts to 0.05 to 4% by weight, calculated as cation oxide and based on the coated powder component.

At the time of incorporation in the dispersing agent, the coating consists of a predominantly inorganic compound, preferably an oxide, hydroxide or oxyhydrate, but it may also consist of other compounds which are sparingly soluble in the dispersion media, e.g., certain carbonates or phosphates. A firm chemical bond between the coating and the raw material component is advantageous for ensuring that the raw material, which may be stored as a dry powder, will be stable in storage and redispersible. The specific surface area of the powder should only be marginally increased by the coating so as not to increase the requirement for dispersant, based on the solids content of the suspension. An increase in the specific surface area of the powder from 11.5 to 64 m$^2$/g, as described by K. Kishi, M. Persson et al in "Interaction of Aluminium/ Iso-Propoxide Solution and Si$_3$N$_4$ powder", J. Ceram. Soc. Jpn. Inter. Ed., 96 (1988), pages 687–689, is invariably a disadvantage as regards the requirement for dispersant the rheology of the slip and the green density.

It has been found advantageous in certain cases to coat the individual raw material separately before their incorporation in the mixture. In this way, the coating conditions can be specifically optimized for each raw material.

According to a preferred embodiment, the cations are Si, Ti, Zr, Sn and /or Fe.

It has been found that a substantial improvement is already obtained if a coating is applied to only individual components, i.e. not to all the raw material components. It was found that the greatest improvement in processing properties could be obtained by adjusting the surface chemistry of those two components which are furthest removed from their respective isoelectric point. Dispersion of the suspension provided the best results when the surfaces of all the components had an isoelectric point of pH$\leq$7.

In raw material mixtures containing Al$_2$O$_3$, an improvement in the quality of dispersion was obtained by coating the Al$_2$O$_3$ component if the isoelectric point of the coating was at pH$\leq$7. The disadvantageous behavior of uncoated aluminium compounds (pure Al$_2$O$_3$: isoelectric point pH$\sim$9) is particularly noticeable when the proportion of uncoated aluminium compound in the raw material mixture is $\geq$5% by weight, especially $\geq$15% by weight, calculated as Al$_2$O$_3$.

The raw material mixture according to the invention therefore preferably contains at least 5% by weight, most preferably at least 15% by weight, of aluminum compounds, calculated as Al$_2$O$_3$. Particularly good results are obtained with raw material mixtures containing more than 30% by weight of aluminum titanate or aluminum titanate mixed crystals after sintering.

It has also been found advantageous to coat the hardest raw material component with a softer cation compound as this has the added effect of reducing the abrasion of pipes, containers, stirrers and kneading and grinding apparatus. This in turn reduces the amount of impurities introduced, such as the alkali metals and alkaline earth metals of hard porcelain drums. The above-mentioned impurities impair the high temperature strength of certain materials, e.g., silicon nitride. From this point of view Al$_2$O$_3$, for example, is less suitable as coating material.

One preferred embodiment relates to aluminum titanate raw material mixtures, e.g., for processing in aqueous slips. The following coating variations have been found to be particularly advantageous for a raw material mixture consisting of pulverulent Al$_2$O$_3$, TiO$_2$, SiO$_2$ and Fe$_2$O$_3$.

TABLE I

Preferred coating variations for an Al$_2$O$_3$/TiO$_2$/SiO$_2$/FeO$_3$ raw material mixture

| | raw material component | | | |
|---|---|---|---|---|
| | Al$_2$O$_3$ | TiO$_2$ | SiO$_2$ | Fe$_2$O |
| Moh' hardness | 9 | 6 | $\leq$6.5 | 6.5 |
| Isoelectric point | pH$\sim$9 | pH$\sim$6 | pH$\sim$2 | pH$\sim$6.5 |
| Case 1: TiO$_2$ coating | X | | (X) | (X) |
| Case 2: SiO$_2$ coating | X | (X) | | (X) |
| Case 3: Fe$_2$O$_3$ coating | X | (X) | (X) | |

X: coating essential
(X): coating optional

The electrolyte concentration is generally found to be raised in aqueous suspensions due to the presence of water-soluble salts in the ceramic powders. Thus about 50% by weight of the Na$_2$O in very finely ground Al$_2$O$_3$ powders is water-soluble. The coatings reduce the electrolyte solubility and thereby increase the stability of the suspension. The reduced electrolyte solubility manifests itself indirectly as a reduced specific electrical conductivity of the suspension.

The coating according to the invention preferably consists of one or more than one predominantly inorganic, sparingly soluble compound.

The invention also relates to processes for the preparation of the raw material mixtures according to the invention. Preparation of the ceramic raw material mixture consisting of at least two chemically different raw material components and characterised in that at least two raw material components have the same type of cation on the surface and at least one of these raw material components is coated with this type of cation in an amount of 0.01 to 6% by weight, calculated as cation oxide and based on the coated pulverulent component, and all the raw material components have a surface with an isoelectric point of $\leq$pH 7, may be carried out by dry mixing, wet mixing, swirling, stirring, grinding, kneading, extrusion or any of the other processes conventionally employed for ceramics. Coating of the desired raw material components is preferably carried out separately before the components are mixed. Application of the coating may be carried out by any methods resulting in a sparingly soluble coating of the above-mentioned compounds on the raw material component, preferably by precipitation, spraying and/or milling. The application of compounds by spraying, e.g., in the case of hydrolyzable organometallic compounds, and subsequent milling in a jet mill has proved to be a particularly advantageous method.

A process in which coating is carried out with sparingly soluble cation compounds or with cation compounds which form sparingly soluble inorganic compounds under the conditions of the process is particularly preferred. Exceptionally good results have been obtained when coating was carried out by application with a cation organic compound and/or sols followed by jet milling, preferably steam jet milling.

One preferred method of coating consists of spraying the $Al_2O_3$ powder with a silicon tetraethylester. Dissolving the alkoxide in an organic solvent which has a low water content is not necessary for this purpose (WO-A 88/00577, page 9, line 6). The sprayed powder is ground in a steam jet mill which at the same time promotes uniform distribution of the coating, hydrolysis and disagglomeration. There is therefore no risk of the particles cementing together. As may be gathered from the following Examples, this procedure may be employed for applying a coating which has significant advantages even after 12 hours' wet milling (WO-A 88/00577, page 5, lines 27/28). Silicon chlorides or chlorosilanes may be used instead of silicon alkoxides. Silica sols are also suitable for coating $SiO_2$.

This invention also relates to the use of the raw material mixture according to the invention for the production of ceramic materials and structural parts. The use of the raw material mixtures according to the invention extends to the whole field of ceramics, including oxidic and non-oxidic ceramics, such as engineering ceramics, bioceramics, electronic, magneto and opto ceramics, refractory ceramics, cutting tools, etc.

A preferred embodiment of the present invention consists in the use of the mixture of raw materials according to the invention of ceramic forming with the aid of electrophoretic deposition.

Electrophoretic deposition has the advantage over conventional slip casting that it can be carried out without the use of the mold material gypsum with its known disadvantages. The various raw material components can only be deposited homogeneously without separation if their electrical charge in the suspension has the same sign and approximately equal charge density. This requirement can be fulfilled by the proposed surface modification.

The mixture of raw materials according to the invention can also advantageously be employed for the production of ceramic layers or structural components by means of flame-spraying or plasma spraying.

The advantages of the raw material mixtures according to the invention containing modified raw materials may be summarized as follows:

Once the surface chemistry of the different powder components has been rendered uniform, generally known, commercially available dispersants which are in some cases free from alkali metals, phosphates and sulphates may be used.

The concentration of dispersing agent required for obtaining a stable suspension is generally reduced (but not necessarily). The lower electrolyte concentration, which manifests itself as a lower specific electric conductivity, is not only advantageous from the point of view of cost but also improves electrostatic stabilization.

Both the viscosity in general and the shear thinning in particular (an indication of a tendency to agglomeration) are reduced. Apart from improving the homogeneity, this enables the concentration of solids in the suspension to be increased, which is economically advantageous.

The improved dispersion quality constitutes to an increased green density, which in turn reduces the shrinkage in sintering, i.e., it improves the dimensional stability of the sintered product. The improved homogeneity of the green product is accompanied by a reduction in the tendency to cracking.

Another advantage, especially when coating the hardest component, e.g. $Al_2O_3$, with a softer component, e.g. $SiO_2$, is the reduced abrasion of the linings and stirrer, grinding and kneading elements. This not only increases the service life but also reduces the introduction of impurities.

The reduced electrolyte solubility of the coated powders in aqueous suspensions has an additional stabilizing effect.

Due to the low concentration of coating additive, the processer of the powder is not limited in his free choice of the composition. Furthermore, a coating cation may be selected which is already present in the bath composition.

The invention is illustrated below with the aid of Examples which, however, are not to be regarded as limiting the invention.

EXAMPLES

The invention will now be illustrated by means of the following Examples without thereby limiting the range of applicability of the invention. The raw materials are weighed out so that the mixture of raw materials contains 56.3% by weight of $Al_2O_3$, 39.3% by weight of $TiO_2$, 2.4% by weight of $SiO_2$ and 2% by weight of $Fe_2O_3$. The aqueous slip, which has a solids content of 70% by weight and contains an alkaline-free dispersant based on a polycarboxylic acid, is milled for 12 hours in a 3-liter mill of hard porcelain containing 2.8 kg of grinding balls of 85% $Al_2O_3$. After characterisation of the slip, the latter is poured into plaster molds.

In spite of its importance, direct quantitative characterisation of the quality of a dispersion is not yet possible. Numerous indirect methods of measurement are, however, available:

Conclusions as to the tendency to agglomeration may be drawn from the rheology of the suspension. Thus a marked shear thinning is an indication of increased formation of agglomerate at lower shear velocities while thixotropy is an indication of agglomerate formation in the unstirred suspension. An increased green density of the ceramic body is an indication of good desagglomeration, as is also dense packing of the sediment in the sedimentation test. Homogeneous ceramic structures free from macro defect may be obtained by good dispersion.

EXAMPLE 1

Comparison

The mixture of raw materials is based on conventional uncoated raw materials. The parameters of the slip and the green density are shown in Table II.

EXAMPLE 2

The $Al_2O_3$ raw material was coated with 0.5% by weight of $SiO_2$. This was carried out by spraying of the raw material with the required quantity of undiluted silicon tetraethyl ester followed by steam jet milling. An additional step of calcining is not required.

Particularly marked features are the reduction in dispersant requirement by 33%, the substantially lower viscosity (at the limit of the Brookfield measuring range) which would allow the solids content to be considerably increased, the superproportional reduction in specific electrical conductivity, the increase in green density by 0.05 g/cm³ and the reduced weight loss of the grinding balls by over 50% by weight.

EXAMPLE 5

The $Al_2O_3$ raw material of Example 4 was again coated with 0.5% by weight of $SiO_2$ (see Example 2). The reduction in disperant requirement and in abrasion of the grinding balls compared with the results obtained in Comparison Example 4 are even more marked than in Examples 1 and 2. In other respects, the tendencies listed above are confirmed.

EXAMPLE 6

The $Al_2O_3$ raw material was in this case coated with 0.2% by weight of $TiO_2$ by spraying the $Al_2O_3$ with Ti-n-butylate and then milling it by steam jet milling.

This variation also shows the same tendencies although not to such a marked degree as in Example 5.

Coating of the surface of $Al_2O_3$ powder makes the greatest contribution to an improvement in the processing properties. Moreover, the $Al_2O_3$ component is to a large extent responsible for the amount of abrasion of the grinding balls. The most advantageous results are obtained by coating the $Al_2O_3$ surface with $SiO_2$.

TABLE II

Mixtures of raw materials, Characterisation and Dispersion

| Raw material mixture | Optimum dispersant concentration [g of active substance / 100 g solid] | Brookfield viscosities (spindle) 0.3 revs/min. [mPa·s] | 3 revs/min | 30 revs min | Specific electric conductivity [mS/cm] | Green density [g/cm³] | Grinding ball abrasion [g/12h] |
|---|---|---|---|---|---|---|---|
| Example 1 (Comparison) | 0.3 | (Spindle 1) 2400 | 600 | 140 | 1.34 | 2.34 | 1.60 |
| $Al_2O_3$ (Quality A) $x_{50}$ <0.5 μm uncoated | | | | | | | |
| $TiO_2$, $x_{50}$ <0.5 μm, uncoated | | | | | | | |
| $SiO_2$, $x_{50}$ <0.3 μm, uncoated | | | | | | | |
| $Fe_2O_3$, $x_{50}$ <0.3 μm, uncoated | | | | | | | |
| Example 2 ($Al_2O_3$ coated with $SiO_2$) | 0.2 | (Spindle 1) 140 | 12 | 1 | 0.74 | 2.39 | 0.75 |
| $Al_2O_3$ (Quality A) $x_{50}$ <0.5 μm, 0.5% by wt. $SiO_2$ | | | | | | | |
| $TiO_2$, $x_{50}$ <0.5 μm | | | | | | | |
| $SiO_2$ and $Fe_2O_3$ as in Example 1 | | | | | | | |
| Example 3 ($Al_2O_3$ and $TiO_2$ coated with $SiO_2$) | 0.2 | 1600 | 270 | 80 | 0.83 | 2.41 | 0.80 |
| $Al_2O_3$ (Quality A) $x_{50}$ <0.5 μm, 0.5% by wt. $SiO_2$ | | | | | | | |
| $TiO_2$, $x_{50}$ <0.5 μm, 0.1% by wt. $SiO_2$ | | | | | | | |
| $SiO_2$ and $Fe_2O_3$ as in Example 1 | | | | | | | |
| Example 4 (Comparison) | 0.3 | (3500 | 800 | 200) | 1.26 | 2.27 | 0.65 |
| $Al_2O_3$ (Quality B) $x_{50}$ <1.0 μm, uncoated | | | | | | | |
| $TiO_2$, $x_{50}$ <0.5 μm, uncoated | | | | | | | |
| $SiO_2$ and $Fe_2O_3$ as in Example 1 | | | | | | | |
| Example 5 ($Al_2O_3$ coated with $SiO_2$) | 0.1 | (Spindle 1) 220 | 1100 | 55 | 0.55 | 2.36 | 0.15 |
| $Al_2O_3$ (Quality B) $x_{50}$ <1.0 μm, 0.5% by wt. $SiO_2$ | | | | | | | |
| $TiO_2$, $x_{50}$ <0.5 μm, uncoated | | | | | | | |
| $SiO_2$ and $Fe_2O_3$ as in Example 1 | | | | | | | |
| Example 6 ($Al_2O_3$ coated with $TiO_2$) | 0.15 | 700 | 220 | 80 | 0.72 | 2.32 | 0.45 |
| $Al_2O_3$ (Quality B) $x_{50}$ <1.0 μm, 0.2% by wt. $TiO_2$ | | | | | | | |
| $TiO_2$, $x_{50}$ <0.5 μm, 0.5% μm, uncoated | | | | | | | |
| $SiO_2$ and $Fe_2O_3$ as in Example 1 | | | | | | | |

EXAMPLE 3

A $TiO_2$ coated with 0.1% by weight of $SiO_2$ was used in addition to the $Al_2O_3$ coated with $SiO_2$. Coating was carried out by the method described above. Although the coating of $TiO_2$ in addition to the coating of $Al_2O_3$ results in a further increase in green density, the rheological parameters are inferior to those of Example 2.

EXAMPLE 4

Comparison

A variety of $Al_2O_3$ which is more coarse grained than that of Example 1 was processed.

It will be appreciated that the instant specification and claims are set forth by way of illustration and not limitation, and that various modifications and changes may be made without departing from the spirit and scope of the present invention.

What is claimed is:

1. A ceramic raw material mixture with improved processing properties comprising at least two chemically different raw material components, wherein at least two of the raw material components have the same or functionally equivalent cation on the surface thereof, at least one of the raw material components being coated with said same or functionally equivalent cation and the coating, calculated as cation oxide, amounting to 0.01 to 6% by weight, based on the coated component, and all the raw material components having a surface with an isoelectric point of ≦pH 7 and a particle size less than 1 μm.

2. A ceramic raw material mixture according to claim 1, wherein the coating amounts to 0.05 to 4% by weight, calculated as cation oxide and based on the coated powder component.

3. A ceramic raw material mixture according to claim 1, wherein the raw material mixture contains at least 5% by weight of aluminum compounds, calculated as $Al_2O_3$.

4. A ceramic raw material mixture according to claim 1, wherein the raw material contains at least 15% by weight of aluminum compounds, calculated as $Al_2O_3$.

5. A ceramic material mixture according to claim 1, characterized in that after such is sintered, the material mixture contains more than 30% by weight of a component selected from the group consisting of aluminum titanate and a aluminum titanate solid solution.

6. A ceramic raw material mixture according to claim 1, wherein the coating comprises one or more of a inorganic, sparingly soluble compound.

7. A ceramic raw material mixture according to claim 6, wherein the coating comprises an oxide, hydroxide, oxyhydrate, carbonate or phosphate.

8. A ceramic raw material mixture according to claim 1, wherein the cation of the coating is Si, Ti, Zr, Sn, Fe or mixtures thereof.

9. A ceramic raw material mixture according to claim 1, wherein the raw material mixture comprises one or more of $Al_2O_3$, $TiO_2$, $SiO_2$ and $Fe_2O_3$.

10. A process for preparing a ceramic raw material mixture with improved processing properties, the raw material mixture comprising at least two chemically different raw material components wherein at least two of the raw material components have the same or functionally equivalent of cation on the surface thereof and all the raw material components having a surface with an isoelectric point of ≦pH 7, the process comprising coating at least one of the raw material components with said or functionally equivalent of cation, as calculated oxide, amounting to 0.1 to 6% by weight based on the coated component, said coating being carried out individually on each component being coated or said coating being carried out together with one or more of the components being coated, by precipitation, spraying and/or milling.

11. A process according to claim 10, wherein the coating is carried out using sparingly soluble cation compounds or cation compounds which form sparingly soluble inorganic compounds under the conditions of the process.

12. A process according to claim 10, wherein the coating is carried out by applying cationorganic compound and/or sol followed by jet milling.

13. A process according to claim 10, wherein the jet milling is steam jet milling.

14. A process according to claim 10, wherein the coating is conducted and then the raw material components are mixed together.

15. A process according to claim 10, wherein the coating is conducted by spraying, followed by an application by milling in a jet mill.

16. A process according to claim 10, wherein the raw material components comprises $Al_2O_3$ powder.

* * * * *

UNITED STATES PATENT AND TRADEMARK OFFICE
CERTIFICATE OF CORRECTION

PATENT NO. : 5,134,100
DATED : July 28, 1992
INVENTOR(S) : Freudenberg et al.

It is certified that error appears in the above-identified patent and that said Letters Patent is hereby corrected as shown below:

| | |
|---|---|
| Col. 10, line 4 | After " equivalent " delete " of " |
| Col. 10, lines 8-9 | After " equivalent " delete " of ", after " cation " delete " as calculated oxide " |
| Col. 10, line 26 | Delete " is conducted " and insert -- step is carried out -- |
| Col. 10, line 31 | After " wherein " insert -- at least one of -- |

Signed and Sealed this

Fifteenth Day of March, 1994

Attest:

BRUCE LEHMAN

*Attesting Officer*    Commissioner of Patents and Trademarks